Figure 1:
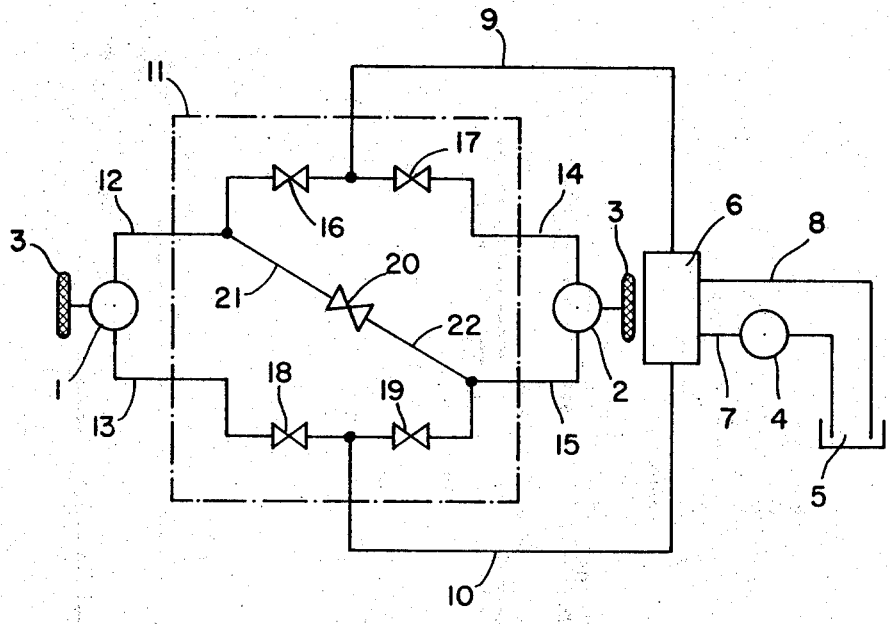

United States Patent

[11] 3,543,645

| [72] | Inventor | Johannes Vagn Baatrup<br>Sonderborg, Denmark |
|---|---|---|
| [21] | Appl. No. | 774,992 |
| [22] | Filed | Nov. 12, 1968 |
| [45] | Patented | Dec. 1, 1970 |
| [73] | Assignee | Danfoss A/S<br>Nordborg, Denmark<br>a company of Denmark |
| [32] | Priority | Dec. 14, 1967 |
| [33] |  | Germany |
| [31] |  | No. 1,630,399 |

[54] CONTROL EQUIPMENT FOR HYDROSTATIC DRIVE OF A VEHICLE
18 Claims, 4 Drawing Figs.

| [52] | U.S. Cl. | 91/413;<br>60/53; 180/6.3 |
|---|---|---|
| [51] | Int. Cl. | 62d 11/00 |
| [50] | Field of Search | 60/53;<br>91/413 |

[56] References Cited
UNITED STATES PATENTS

| 2,060,220 | 11/1936 | Kennedy | 60/53 |
| 2,903,852 | 9/1959 | Bottoms | 60/53 |
| 3,138,218 | 6/1964 | Mark et al. | 91/413X |
| 3,261,421 | 7/1966 | Forster et al. | 60/53X |
| 3,435,616 | 4/1969 | Waldorff | 60/53X |

*Primary Examiner*—Edgar W. Geoghegan
*Attorney*—Wayne B. Easton

ABSTRACT: The invention relates to a control apparatus for the hydrostatic drive of a vehicle having at least two wheels and hydraulic motors for driving the wheels. The control apparatus functions to selectively drive the motors in parallel or series and to selectively supply higher pressure fluid to one of the wheels to effect turning of the vehicle.

CONTROL EQUIPMENT FOR HYDROSTATIC DRIVE OF A VEHICLE

This invention relates to control equipment for the hydrostatic drive of a vehicle comprising two hydraulic motor sets, each associated with one side of the vehicle, which motor sets can be selectively brought into series or parallel by means of blocking members. Each set normally consists of one motor and the associated motors drive one pair of wheels.

When in series, the motors have a greater speed and lower torque than when they are in parallel. The changeover is therefore comparable with the normal gearshift between an internal combustion engine and the wheels of a vehicle.

It is also known, for the purpose of steering a vehicle, to associate regulating members with both motor sets, in order to supply more fluid to one motor than to the other, as selected, so that a right-hand or left-hand turn results. If, however, steering equipment of this kind is used in combination with reversible control equipment, this causes considerable difficulties, since the regulating members must be switched over with the motors and, as regards width of opening, length of actuating movement etc., can be adapted to only one of the two control positions.

The object of the invention is to combine a control device for switching from series to parallel operation and vice versa with a steering device for variably loading the motor sets, in such manner that, when the motors are changed over, the correct changeover of the regulating members and their adaptation to the particular form of operation are achieved in a simple manner.

According to the invention, this object is achieved by each side of both motor sets being connected to the supply pipes by way of a parallel throttle member and one side of one motor set being connected to the opposite side of the other motor set by way of a series throttle member, by the series throttle member being closed during parallel operation and all the parallel throttle members being opened and the two parallel throttle members of each motor set being so connected that they throttle in unison and in the same direction, and, during series operation and in the initial position, by opening the series throttle member and the parallel throttle members connected to the sides of the motor sets opposite thereto, closing the two other parallel throttle members and so connecting the pairs of parallel throttle members associated with each supply pipe to the series throttle member that the opened parallel throttle member and the series throttle member throttle in unison and in the same direction and the closed parallel throttle member opens in the opposite direction.

In this control equipment, the blocking members required for the changeover are also used as throttle members for the operation of regulating the steering. Due to the special connection between the various throttle members a throttling action is obtained which is dependent upon the particular control position (and thus independent of the other control position). This leads to a combined, but very a simple control system which can be accommodated in a small space.

It is even possible to displace the entire control and throttling system by means of a single handle. For this purpose it is only necessary to cause the throttle members to be moved by means of a cammed actuating shaft, which has at least two axially offset positions for series and parallel operation.

A further simplification is achieved if the throttle members take the form of slides and the pairs of parallel throttle members, each associated with a supply pipe, are brought together in one slide. Thus, only three slides are required for all the blocking members and throttle members.

The most advantageous arrangement of all the parts is achieved if the two parallel throttle member slides are positioned in one plane coaxially on both sides of the shaft and the series throttle member slide is disposed at right angles to this axis in a parallel plane axially offset therefrom.

In a further form of the invention, the same first cam can displace the two parallel throttle member slides in the parallel position of the shaft and can displace the series throttle member slide in the series position of the shaft, the last-named slide being disposed at right angles to the two first-mentioned slides. Here, in particular, the first cam can take the form of an eccentric circle. A construction which is short in the axial direction can be achieved through the double use of this cam.

Advantageously, in its middle position, the second cam, acting on the parallel throttle members when the shaft is in the series position, holds both parallel throttle member slides in their end position, but upon being rotated, it displaces only one of the parallel throttle member slides, its coordination with the first cam being such that the series throttle member is throttled at the same time. In particular, the second cam can here be defined by an arc about the axis of rotation of the shaft and by an arc about an offcentre point. Such a cam enables the two parallel throttle member slides to be disposed in the same cross-sectional plane, so that the axial length of the equipment is again reduced.

In order to facilitate changeover, the two adjacent cams can merge one into the other by way of inclined transition surfaces. An inclined transition surface can likewise be present between the end-face of the shaft and the adjacent cam.

If the series throttle member slide has a stop, limiting its inner end position, and is axially offset from the parallel throttle member slides in the direction of the end of the shaft, the first-mentioned slide remains in its nonoperative position even when it is no longer backed by a cam. It is therefore possible to position it so closely alongside the end wall of the housing that it is actuated by a cam only in the series position of the shaft. This results in a very short actuating shaft and thus in equipment which is short in the axial direction.

In an advantageous arrangement of the device, the projections of the axes of the two parallel throttle member slides and of the series throttle member slide intersect at the centre point of the first cam, formed as an eccentric disk and the axis of rotation of the shaft, the centre point of the first cam and the offcentre point of the second cam are positioned, in that order, on the projection of the axis of the series throttle member slide. Here, the distances between the axis of the shaft and the centre point of the first cam, on the one hand, and the offcentre point of the second cam, on the other hand, should be equal.

In a preferred construction, the actuating shaft has at least one further cam, acted upon by a spring-loaded plunger, which directs the shaft into the middle position corresponding to straight-ahead travel. Here, two axially offset further cams can be provided, which form lateral limits, so that the plunger fixes the axial position of the shaft.

Figure 2:
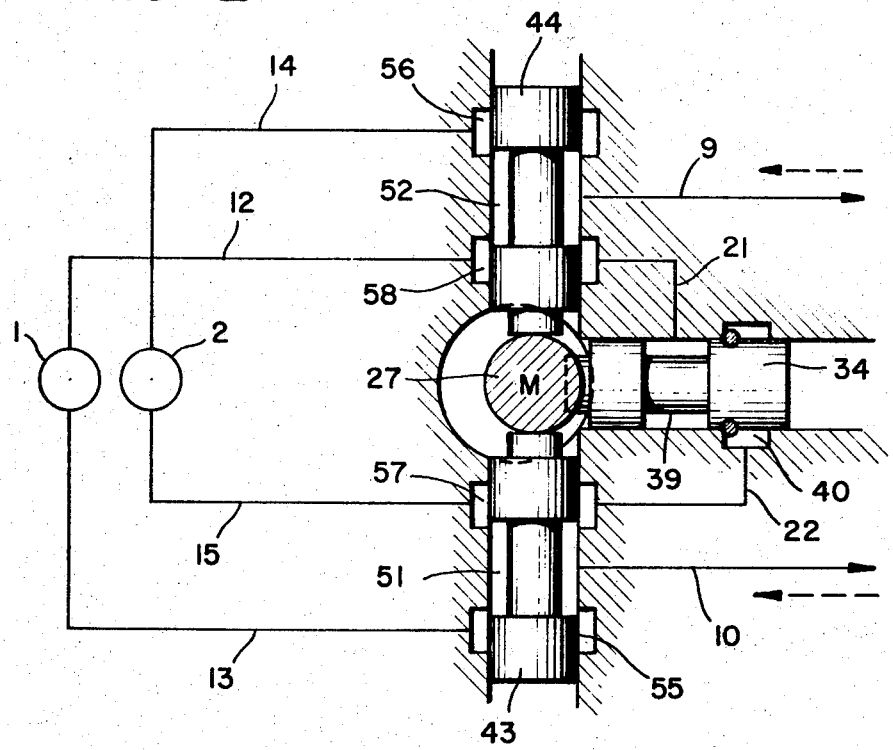
Figure 3:
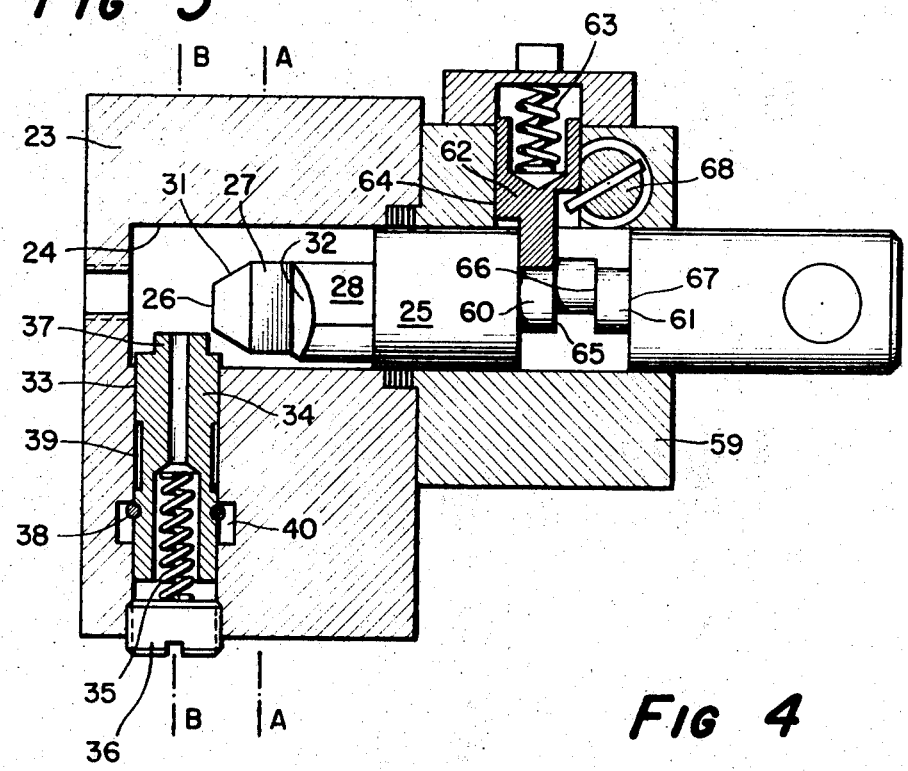
Figure 4:
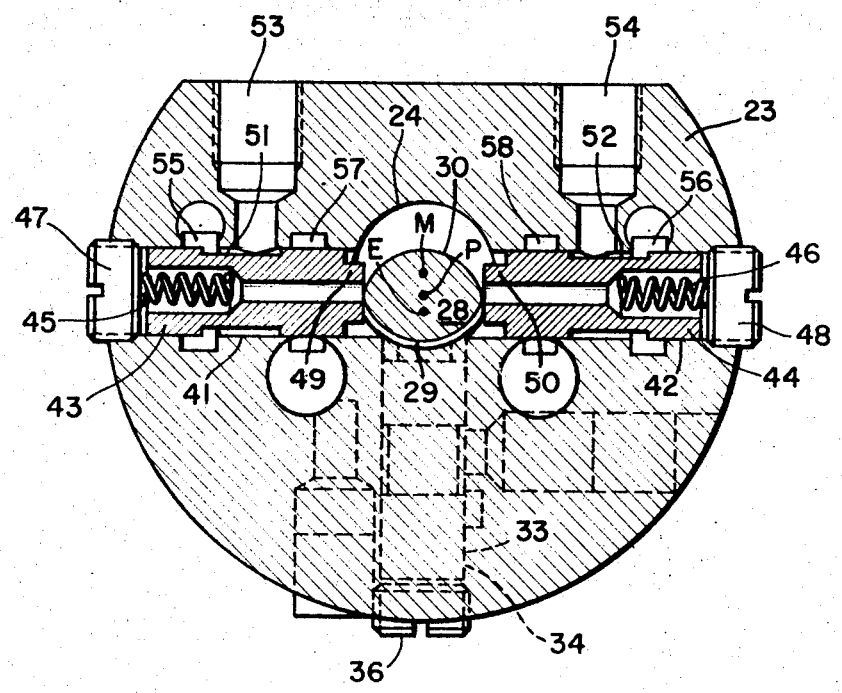

The invention will now be explained in more detail by reference to the drawing, wherein:

FIG. 1 shows the circuit diagram for the control equipment according to the invention, FIG. 2 shows the important parts in one embodiment, together with the appropriate connections, in the parallel position, FIG. 3 is a longitudinal section through the embodiment, in the parallel position, and FIG. 4 is a cross section through the embodiment, on line A-A of FIG. 3, in the series position.

In the control system shown in FIG. 1, two motors 1 and 2 for a pair of wheels 3 are provided, by a pump 4, with fluid under pressure, which is drawn from a sump 5 and returned thereto. A control device 6 enables the speed of travel to be adjusted because a part of the fluid under pressure fed through the pump pipe 7 is returned directly to the discharge pipe 8. The control device 6 can also be used for changing over from forward to reverse travel, in that the two supply pipes 9 and 10, running to the motors, can be crossed with each other. The supply pipes lead, through the control device 11 according to the invention, to two pairs of connecting pipes 12 and 13, and 14 and 15, for the two motors 1 and 2.

In the control device 11, there are provided five throttle members 16—20. Parallel throttle members 16a and 17 are disposed between the supply pipe 9 and the connecting pipes 12 and 14 respectively, and parallel throttle members 18 and 19 between the supply pipe 10 and the connecting pipes 13 and 15 respectively. Also, the two connecting pipes 12 and 15 are interconnected through the series throttle member 20, two pipe portions 21 and 22 being used for this purpose.

As will be seen below, the individual throttle members 16—20 are interconnected in such a way that the required rotation to the right or left is obtained when an adjusting movement is made. In this connection, the following occurs:

In the case of parallel operation, the series throttle member 20 remains closed. For straight-ahead travel the parallel throttle members 16—19 are fully opened. For a left-hand turn, during which the motor 1 must run more slowly, the throttle members 16 and 18 are simultaneously actuated in the direction for closing, and for a right-hand turn, during which the motor 2 must run more slowly, the throttle members 17 and 19 are simultaneously actuated in the direction for closing.

In the case of series operation, the parallel throttle members 18 and 17 and the series throttle member 20 are fully opened for straight-ahead travel and the parallel throttle members 16 and 19 are closed. For a left-hand turn, the members 18 and 20 are simultaneously actuated in the direction for closing, and the member 19 in the direction for opening. For a right-hand turn, the members 17 and 20 are simultaneously actuated in the direction for closing and the member 16 in the direction for opening. In all cases, symmetrical pressure conditions obtain in the motors.

A practical form of construction of the control device 11 is illustrated in FIGS. 2—4. Fitted in a housing 23 in an axial bore 24 is an actuating shaft 25, which, with the help of a handle disposed at its outer end, is rotatable as well as axially displaceable. Near its end face 26, it carries a cam 27 in the form of a circular disk disposed eccentrically of the axis M of the shaft and, axially offset therefrom, a second cam 28 which is formed by an arc 29 about the axis of the shaft and by an arc 30 about an offcentre point E. Between the end face 26 and the cam 27 there is provided an inclined transition surface 31, and between the two cams 27 and 28 an inclined transition surface 32.

In a plane B near the end plate of the housing 23, there is provided, below the bore 24, a bore 33 containing a slide 34. The latter is pressed inwards by a spring 35 backed by a setscrew 36 until its inner plunger 37 bears against the cam 27 or until it is held in the position illustrated in FIG. 3 by a stop ring 38. The slide 34 has an annular groove 39. An annular groove 40 is provided in the housing. The slide arrangement 33 and 34 forms the series throttle member 20, which is opened as soon as the two annular cavities 39 and 40 are caused to communicate with each other.

In the plane A (FIG. 4) are two axially parallel bores 41 and 42, at right angles to the bore 33, in which bores 41 and 42 are disposed slides 43 and 44 which are pressed by their inner plungers 49 and 50 against the cam 27 or 28, by the force of springs 45 and 46 respectively, which are backed by setscrews 47 and 48. Each slide has an annular groove 51 and 52, which can be caused to communicate with the supply pipes 9 and 10 through ports 53 and 54. To the left and right thereof annular cavities 55 and 56, and 57 and 58, respectively, are present in the housing 23. The slide arrangement 41 and 43 forms the parallel throttle members 18 and 19 and the slide arrangement 42 and 44 forms the parallel throttle members 16 and 17, which are each opened when the annular grooves 51 and 52 in the slide communicate with one of the annular grooves 55—58 in the housing.

A number of bores extend through the housing 23, these not being shown in detail and being connected with each other or with the supply pipes and connecting pipes through the annular cavities in the various valves, as indicated schematically in FIG. 2, wherein, for greater clarity, the slide 34 has been moved into the same plane as the slides 43 and 44, but does not bear on a cam through its plunger 37.

In the embodiment illustrated, the common axis of the bores 41 and 42 are not only at right angles to the projection of the axis of the bore 33, but also intersect the two projections at a point P which is positioned precisely at the centre between the axis M of the shaft the offcentre point E of the second cam 28. This point P is also the centre point of the circular disk forming the first cam 27.

A bearing block 59 for the actuating shaft 25 is flanged on to the housing 23. Within this block, the actuating shaft has two further cams 60 and 61, which are of such shape that the shaft 25 automatically returns to the neutral position when a radially displaceable plunger 62 is pressed inwards, by the force of the spring 63, on the cam. The two cams 60 and 61 are bounded on both sides by walls 64—67, which provide for the plunger 62 retaining the shaft in its axial position as selected. The plunger 62 can be lifted out of the locking position by means of a rotatable bolt 68, so that the shaft can be axially displaced.

Parallel operation, to which FIGS. 2 and 3 relate, will first be considered. Here, the series slide 34 is not acted upon by any cam in its cutoff position. The two parallel slides 43 and 44 are acted upon by the first cam 27. In the neutral position, illustrated in FIG. 2, fluid under pressure flows evenly from the supply pipe 10, via the two annular cavities 55 and 57 into the supply pipes 13 and 15 and to the motors 1 and 2, whilst the returning fluid from the pipes 12 and 14 is passed back evenly into the pipe 9 through the annular cavities 56 and 58. Upon the shaft being rotated, the slides 43 and 44 are moved in the same direction. The flow cross sections either between the annular cavities 55 and 58 or between the annular cavities 57 and 56 and the associated annular grooves 51 and 52 are hereby uniformly reduced, whilst the flow cross sections between each of the other annular cavities and the annular grooves 51 and 52 are increased. Consequently, less fluid under pressure is supplied to one motor, whilst the other motor receives a correspondingly greater amount of fluid or the quantity flowing through it is at least maintained.

If, for series operation, the actuating shaft is displaced to the left (FIG. 3), the series slide 34 is acted upon by the first cam 27, and the parallel slides 43 and 44 are acted upon by the second cam 28 (FIG. 4). Upon rotating the shaft 25 from the neutral position, the slide 34 moves inwards, so that the cross section between the annular cavities 39 and 40 is throttled. The two parallel slides 43 and 44 are in the outward position, in which only the outer annular cavities 55 and 56 communicate with the annular supply grooves 51 and 52. Upon the shaft being rotated, one slide is held in this position, whilst the other slide can move inwards, so that the hitherto opened cross section is throttled and the hitherto closed cross section is gradually opened.

Thus, as a result of the axial displacement of the shaft, not only are the individual throttle members brought into the required position for parallel operation and series operation respectively, but they are brought to the ready position by the corresponding cams in such a way that when the shaft is turned they effect a throttling action such that like angles of rotation of the shaft in series operation and in parallel operation lead to roughly the same changes in direction of travel.

I claim:

1. Control apparatus for the hydrostatic drive of a vehicle having first and second hydraulic motors on opposite sides of the vehicle comprising, first and second sets of motor ports, a set of alternative supply and exhaust ports first and second conduit means connecting said supply port to said first set of motor ports and third and fourth conduit means connecting said exhaust port to said second set of motor ports, said first and third conduit means being connected to a first pair of said ports to which said first motor is connectable, said second and fourth conduit means being connected to a second pair of said ports to which said second motor is connectable, series conduit means connecting a port of one of said motor port sets with a port of the other of said motor port sets, throttle valve means for controlling fluid flow from full flow to no flow in each of said conduit means, and valve control means for effecting (1) a parallel nonturn operation by maintaining all of said conduit means open except said series conduit means, (2) a parallel turn operation by maintaining said series conduit means closed and selectively increasing the fluid flow through one of said pairs of ports while decreasing the fluid flow through the other of said pairs of ports, (3) a series nonturn operation by maintaining all of said conduit means open except said motor port sets not connected by said series conduit means, and (4) a series turn operation by selectively increasing the fluid flow through one of said pairs of ports, decreasing the fluid flow through said series conduit means and a port in one of said sets of ports, and closing the other port in said last mentioned set of ports.

2. Control apparatus according to claim 1 including a shaft having first and second cam means for actuating said throttle valve means.

3. Control apparatus according to claim 2 wherein said throttle valve means comprises a first spool valve for said first and second conduit means, a second spool valve for said third and fourth conduit means, and a third spool valve for said series conduit means, said first and second spool valves being in axial alinement.

4. Control apparatus according to claim 3 wherein said first and second spool valves are on opposite sides of said shaft and said third spool valve is axially a spaced from said first and second spool valves.

5. Control apparatus according to claim 4 wherein said cam means have parallel and series operating positions, said first cam means being in actuating engagement with said first and second spool valves in its parallel operating position and being in actuating engagement with said third spool valve in its series operating position, said second cam means being in actuating engagement with said first and second spool valves in its series operating position.

6. Control apparatus according to claim 5 wherein said first cam is cylindrically shaped and is eccentrically offset relative to the axis of said shaft.

7. Control apparatus according to claim 6 wherein said first and second spool valves each has three operating positions for controlling one of said sets of ports with one of the operating positions being to maintain the two ports in the set open and the other two operating positions being to selectively increase the fluid flow in one of the ports of the set while decreasing the fluid flow in the other of the ports of the set.

8. Control apparatus according to claim 7 wherein said second cam means has a concentric surface relative to the axis of said shaft and a cylindrically shaped eccentric surface relative to the axis of said shaft.

9. Control apparatus according to claim 8 wherein said shaft has two axial positions corresponding to parallel and series operation and is rotatable.

10. Control apparatus according to claim 9 wherein said first cam means in its parallel operating position has a rotationally neutral position wherein said first and second spool valves are maintained inwardly towards each other for maintaining all of the ports in said two sets of ports open, said first cam means having opposite angular positions from said neutral position wherein said spool valves are moved in unison in either direction to simultaneously increase the fluid flow through one of said pair of ports and to decrease the fluid flow through the other of said pair of ports.

11. Control apparatus according to claim 9 wherein said first and second cam means in their series operating positions have rotationally neutral positions wherein said first cam means engages said third spool valve to maintain it in an open position and said second cam means engages said first and second spool valves to maintain one port in each of said pair of ports open and one in each of said pair of ports closed, said first and second cam means having angular positions displaced from said neutral positions wherein said first cam means causes said third spool valve to throttle and said second cam means selectively causes only said first or second spool valve to be displaced to effect throttling thereof.

12. Control apparatus according to claim 8 wherein said first and second cam surfaces are mergingly connected by an inclined surface.

13. Control apparatus according to claim 12 wherein said first cam surface has a frustoconically shaped surface forwardly extending therefrom in the direction of said third spool valve.

14. Control apparatus according to claim 13 wherein biasing means and stop means are provided for limitingly positioning said third spool valve in an open position in the path of said shaft.

15. Control apparatus according to claim 8 wherein said concentric and said cylindrically shaped surfaces of said second cam means are symmetrical relative to a point which is eccentrically offset relative to the axis of said shaft, said point being coincident with the common axis of said first and second spool valves when said shaft is in its neutral position, said point being between the axis of said shaft and the axis of said first cam means.

16. Control apparatus according to claim 15 wherein said point is midway between the axis of said shaft and the axis of said first cam means.

17. Control apparatus according to claim 9 wherein positioning cam means and resilient means are provided for maintaining said shaft in its angular neutral position.

18. Control apparatus according to claim 17 wherein said positioning cam means includes abutment means for fixedly maintaining said shaft in selected axial positions corresponding to said parallel and series modes of operation.